United States Patent

[11] 3,626,173

[72] Inventor George H. Harvey
6408 Thunderbird Drive, Nashville, Tenn. 37209
[21] Appl. No. 876,854
[22] Filed Nov. 14, 1969
[45] Patented Dec. 7, 1971

[54] FLOAT LIGHT
4 Claims, 3 Drawing Figs.

[52] U.S. Cl. .................................................. 240/26,
9/8.3 E, 240/6.4 F, 240/52.1
[51] Int. Cl. ..................................................... F21v 21/00
[50] Field of Search ........................................... 9/8.3, 8.3 E;
43/17.5; 240/26, 52, 6.4 CE, 7.5, 6.4, 11.2, 52.1, 52.3

[56] References Cited
UNITED STATES PATENTS
2,593,171 4/1952 Morse .......................... 240/26
3,064,122 11/1962 Reeder, Jr. .................. 240/52.1 X
3,464,139 9/1969 Eggers ........................... 43/17.5

Primary Examiner—James J. Gill
Attorney—Harrington A. Lackey

ABSTRACT: An illuminating device including a floating body and a sealed beam lamp supported face down in the body for projecting a light beam from the bottom of the body. Support means are provided in the body to prevent the lamps from dropping down, and flexible retainer members are provided in the body for lateral movement above the lamp to releasably retain the lamp in place.

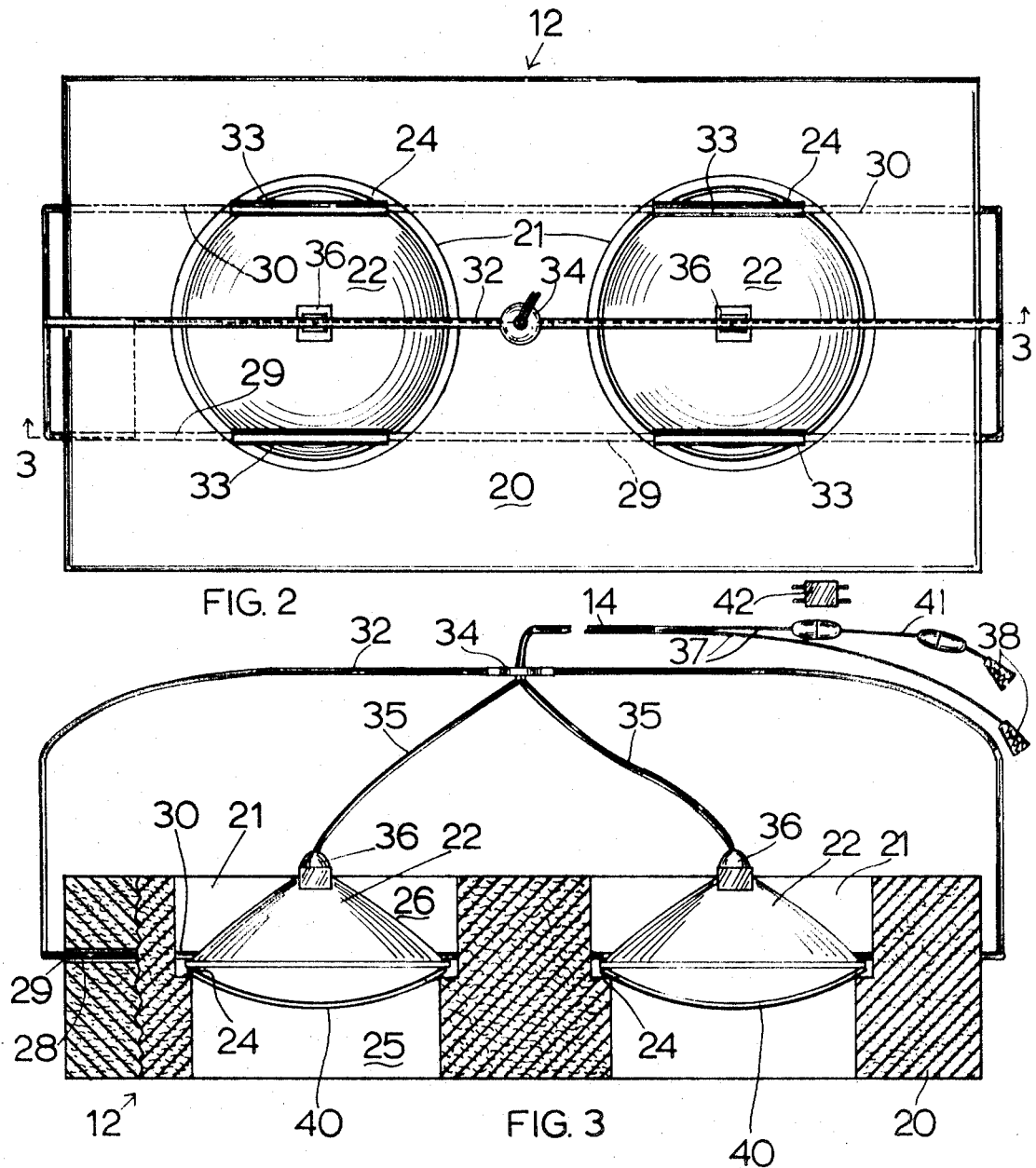

FLOAT LIGHT

BACKGROUND OF THE INVENTION

This invention relates to an illuminating device, and more particularly to a float light.

Floating lights are generally known in the art. There are on the market flashlights sealed in hollow or buoyant casings to permit them to float, if accidentally dropped into the water. Furthermore, it is known that light attracts fish, and lights have been used in various ways in connection with fishing apparatus or conventional floats for the attraction of fish.

Many of these fishing light lures are of rather complicated constructions, and therefore quite expensive.

SUMMARY OF THE INVENTION

This invention contemplates a float light, primarily designed for use in fishing, but also having many other uses. This illuminating device incorporates one or more relatively powerful, sealed beam lamps secured within a buoyant or floating body to form a compact unit, in which the lamps are readily accessible for removal and replacement.

The lamps are provided with electrical energy from a separate, and remote, electrical storage battery through electrical leads.

The illuminating device also contemplates a bail for carrying the body, which is interrelated with the lamp retaining means so that the lamps are retained in place while the body is being carried.

BRIEF DESCRIPTION OF THE DRAWINGS

FIG. 2 is an enlarged top plan view of the float unit; and

FIG. 3 is a section taken along the line 3—3 of FIG. 2, of the float only.

DESCRIPTION OF THE PREFERRED EMBODIMENT

Figure 1:
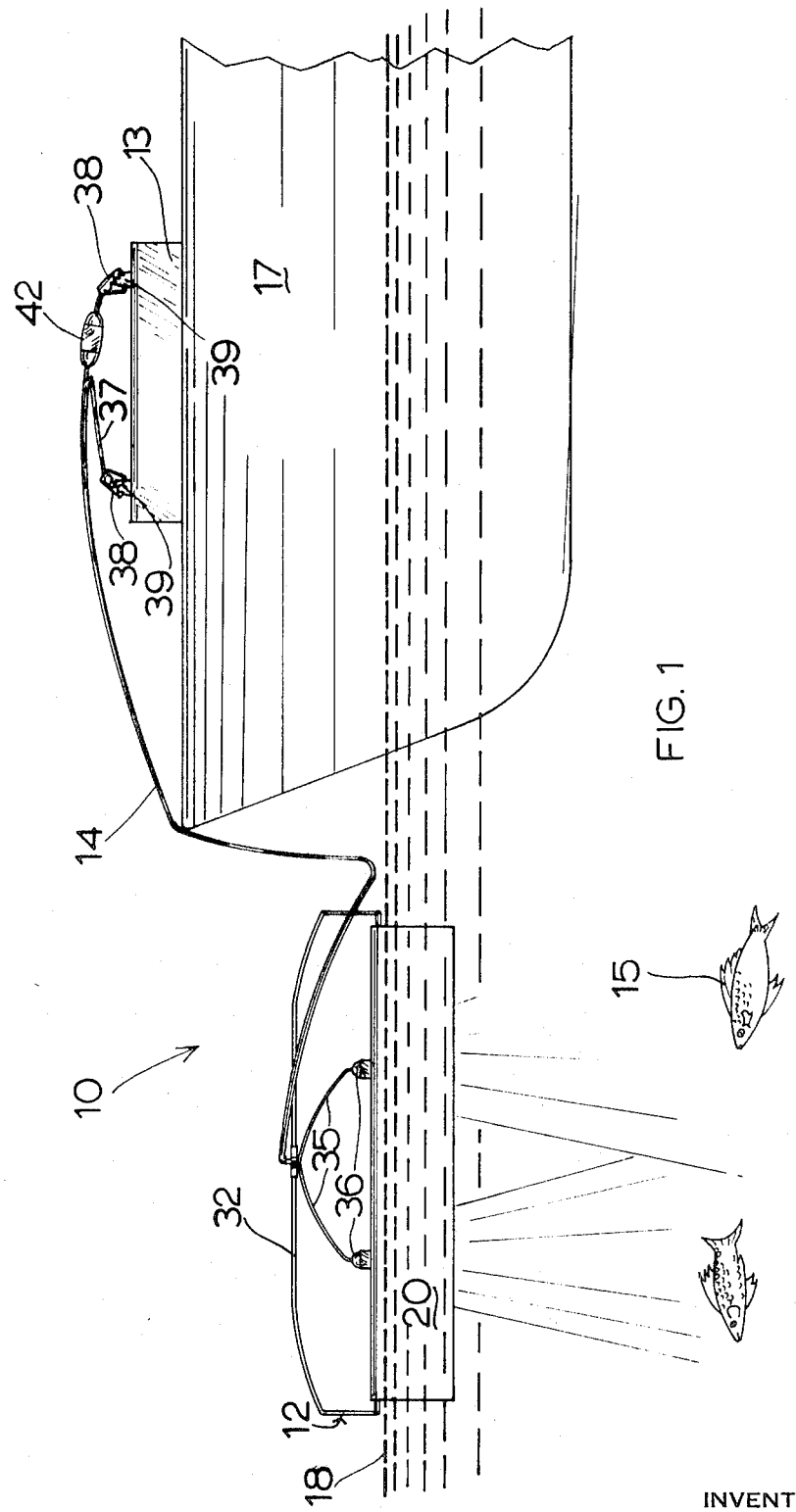
FIG. 1 is a side elevation of the device in operation as a fishing lure, showing the float light unit floating in the water and the battery carried in a boat, shown fragmentarily.

Referring now to the drawings in more detail, FIG. 1 discloses the illuminating apparatus 10 including the float unit 12, electrical storage battery 13 and the connecting electrical cable 14. The illuminating device 10 is depicted in FIG. 1 for use as a lure or means for attracting fish 15. For use as a lure, the battery 13 may be supported in a boat 17, or it may rest upon the bank of a stream, river or lake, in which the presence of fish is suspected. The opposite ends of the cable 14 are connected to the battery 13 and the float unit 12, and the float unit 12 deposited in the water to float upon the surface 18.

The float unit 12 comprises a buoyant body 20, such as a block of foamed plastic, such as polystyrene foam. A pair of cylindrical lamp holes 21 are formed entirely through the foam block 20 from top to bottom to receive a pair of electrical sealed beam lamps 22, such as the 12-volt head-light sealed beams used in motor vehicles.

To support the lamps 22 within the holes 21, an annular ledge 24 is formed intermediately between the top and bottom of each hole 21 so that the lower portion 25 of each hole 21 is of slightly smaller diameter than the upper portion 26 of the hole. The diameter of the lower hole portion 25 is slightly less than the diameter of the lamp 22, so that the lamp 22 may rest upon the annular ledge 24, face down, without danger of dropping through the bottom of the hole 21. However, the annular ledge 24 offers no restraint to the upward movement of the lamp 22, for easy removal and replacement of the lamp within the hole 21.

Extending longitudinally through guide holes 28 in the float block 20 are a pair of elongated flexible members, such as the elongated metal wires 29 and 30. The wires 29 and 30 are disposed parallel to each other and spaced apart a distance less than the maximum diameter of each lamp 22 and equally spaced on opposite sides of the common center line of the lamps 22. The opposite ends of the flexible wires 29 and 30 extend outward from opposite ends of the float block 20 and are joined to each other and to the opposite ends of a flexible wire bail 32. The bail 32 extends the length of and across the top of the float block 20. There is enough spacing between the connections of the bail 32 and the wires 29 and 30 to permit limited longitudinal movement of the wires 29 and 30 through their respective guide holes 28.

Thus, by moving either or both wires 29 and 30 laterally or upward away from engagement with the back of the lamp 22, each lamp 22 may be tilted to be moved upward past the retaining wires 29 and 30 and thereby be completely removed from the float block 20. The portions of the wire 29 and 30 which actually cross and come in contact with the back of the lamps 22 may be encased in sleeves 33 of soft material which will protect the surface of the back of the lamps 22. Such sleeves 33 may be of rubber or any other soft material.

The bail 32 may be provided with a cable guide 34 in the form of an eyelet for receiving the branch leads 35, each of which is connected by an electrical connector 36 to a lamp 22, and which merges into the cable 14. The remote end of the cable 14 is again divided into branch leads 37, each of which is provided with alligator clips 38 to fit on the posts 39 of the storage battery 13. The cable 14 may be of any desired length, depending upon how far the float unit 12 is to be positioned away from the battery 13.

The illuminating device 10 may also be used as a fishing lure as previously described and disclosed in FIG. 1, but may also be used for other illuminating purposes. The bail 32 may be hung upon an overhead support, such as a tree branch to provide an overhead source of illumination for camping or other outdoor activities. The float unit 12 and cable 14 may be carried in the trunk of a car, where they will be available for use as an emergency light by connecting the alligator clips 38 to the post 39 of the vehicle storage battery 13.

As disclosed in FIG. 3, a red, or other colored, lens 40 may be inserted between the face of the lamp 22 and the annular ledge 24 so that the beam directed from the bottom hole portion 25 may be a red light. One of the battery leads 37 may be provided with a removable section 41 for replacement by a flasher unit 42. Thus, when the alligator clips 38 are connected to the motor vehicle battery 13, and the float 12 is placed upon its side, the unit becomes a flashing red emergency signal.

What is claimed is:

1. An illumination device comprising:
    a. a buoyant body adapted to float in water, and having a top and a bottom,
    b. a sealed beam, electric lamp having an illuminating face and a back,
    c. a translucent opening through said body,
    d. means for supporting said lamp face down in operative position against downward movement through said body, so that light rays from said face project down through said opening, said supporting means offering no resistance to upward movement of said lamp,
    e. at least one elongated flexible retainer member mounted in said body above and spanning said lamp in operative position,
    f. said retainer member being supported in said body for limited movement between a normal retaining position engaging a portion of the back of said lamp and a releasing position away from said lamp to permit the removal of said lamp from said body,
    g. a source of electrical energy, and
    h. a lead connecting said energy source to said lamp.

2. The invention according to claim 1 in which said at least one elongated flexible retainer member comprises two elongated flexible members, each member extending across opposite edge portions of said back.

3. The invention according to claim 2 further comprising an elongated bail member extending across the top of said body, the ends of said bail member being connected to the opposite ends of said flexible members, so that the lifting of said bail member draws said flexible members taut across the back of said lamp in retaining position.

4. The invention according to claim 2 in which the means for mounting said retainer members comprise guide openings through said body receiving said flexible members for free longitudinal movement.

* * * * *